J. HARRIS.
BLOWPIPE BURNER.
APPLICATION FILED OCT. 20, 1915.
1,311,815.
Patented July 29, 1919.
2 SHEETS—SHEET 1.
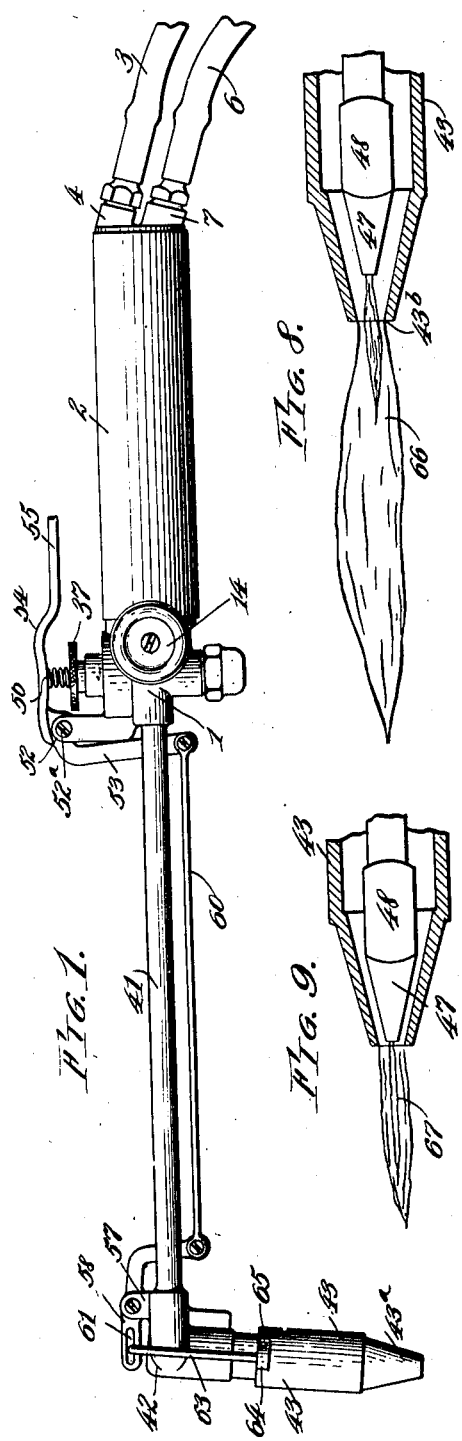
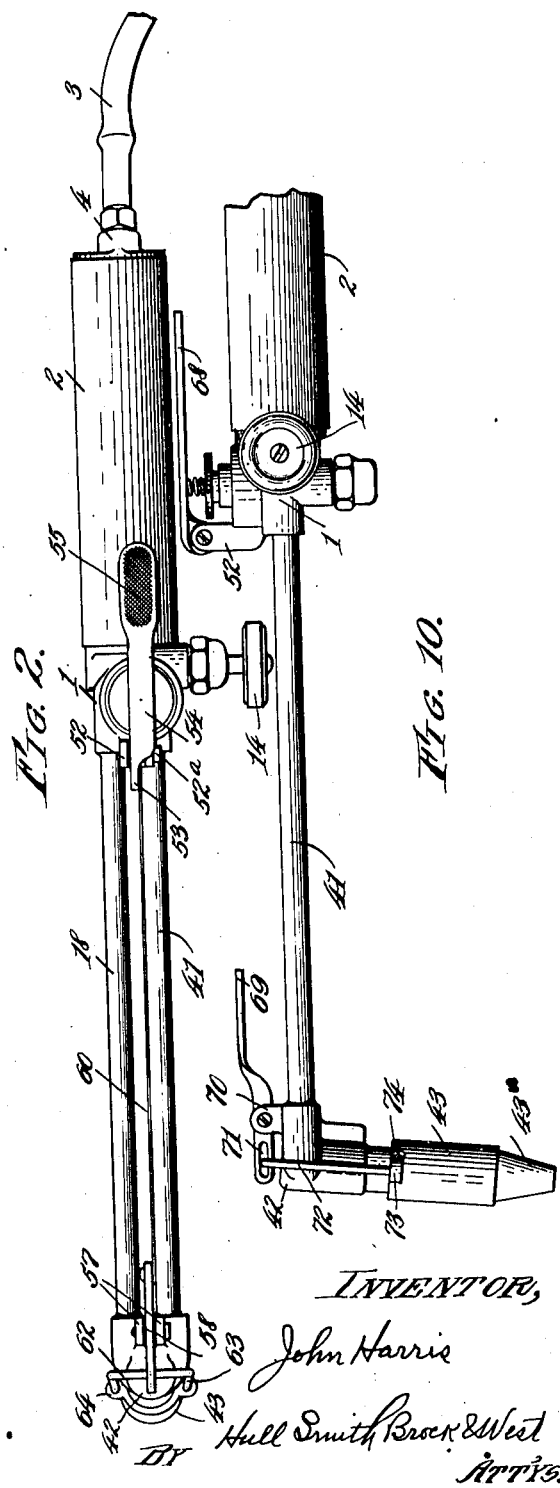
INVENTOR,
John Harris
BY Hull Smith Brock & West
ATT'YS.

J. HARRIS.
BLOWPIPE BURNER.
APPLICATION FILED OCT. 20, 1915.
1,311,815.
Patented July 29, 1919.
2 SHEETS—SHEET 2.
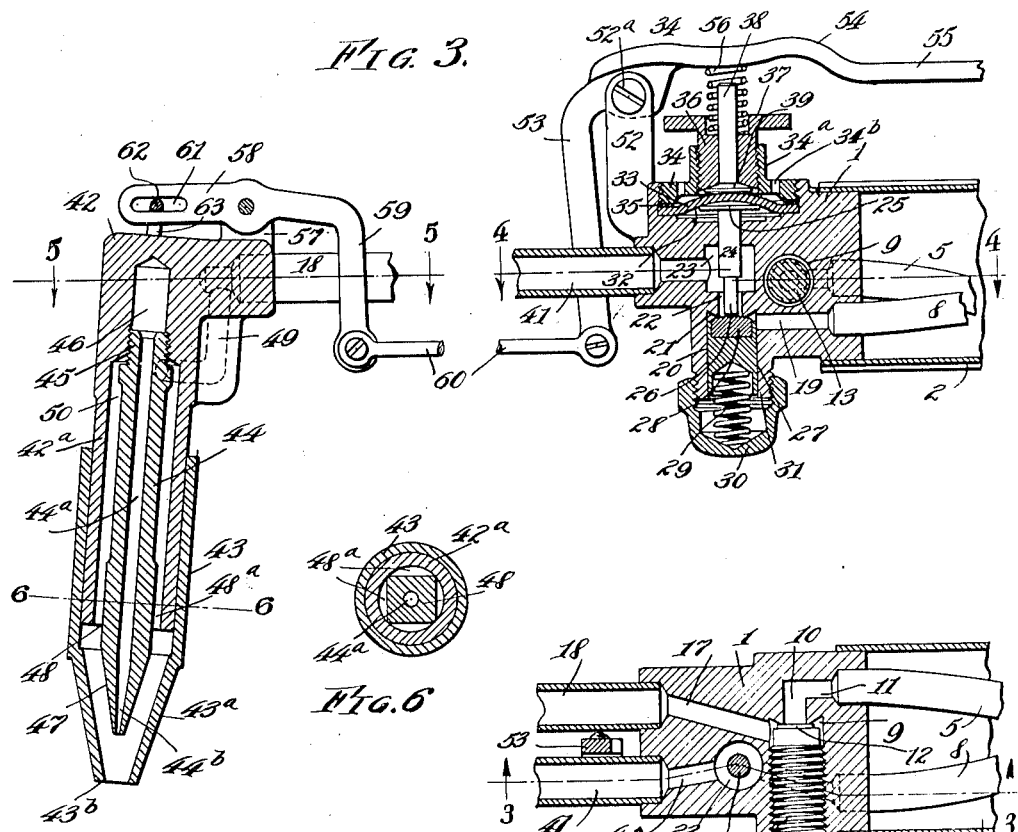
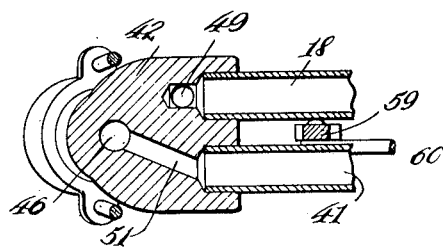
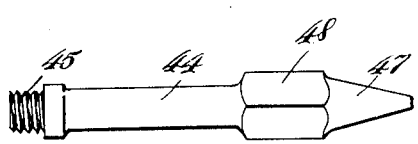
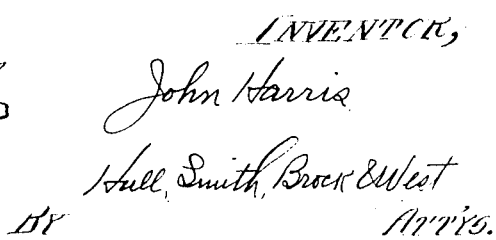
INVENTOR,
John Harris
Hull, Smith, Brock & West
ATTYS.

UNITED STATES PATENT OFFICE.

JOHN HARRIS, OF CLEVELAND, OHIO.

BLOWPIPE-BURNER.

1,311,815.  Specification of Letters Patent.  Patented July 29, 1919.

Application filed October 20, 1915. Serial No. 56,988.

*To all whom it may concern:*

Be it known that I, JOHN HARRIS, a citizen of the United States, residing at Cleveland, in the county of Cuyahoga and State of Ohio, have invented a certain new and useful Improvement in Blowpipe-Burners, of which the following is a full, clear, and exact description, reference being had to the accompanying drawings.

This invention relates to a device for burning gases and, as exemplified herein, has special reference to the heat treatment of metals, particularly to cutting the same by the use of oxygen; also to an apparatus in the shape of a blow pipe or torch, whereby the operation may be conveniently and efficiently realized.

As is well known to those who are familiar with the art, the cutting of metal by oxygen has been contemplated and practised by two kinds of torches or blow pipes, in one of which the combustible gas (acetylene, natural gas or other suitable fuel) is conducted to a nozzle or pipe surrounding a centrally or axially arranged oxygen tip, the nozzle extending beyond the oxygen tip whereby a mixture of the combustible gas and oxygen will be produced within the discharge end of the torch for the purpose of preheating the iron or other metal to be cut and, when the metal has been brought to the proper temperature, an excess of oxygen is supplied through the central oxygen tip whereby the preheated metal will be cut.

In the other type, the mixture of oxygen and combustible gas for preheating purposes is supplied through a suitable burner or torch while the oxygen for cutting is conducted through an independent tube—separate from that which supplies the oxygen for the preheating mixture. This independent or separate supply of oxygen may be conducted through a pipe located outside of the blow pipe or through a tip within the blow pipe and preferably arranged centrally with respect thereto.

In cutting with apparatus heretofore in general use, the combustible fluid employed is expensive—acetylene being used to a great extent for this purpose. It is one of the objects of my invention to provide an apparatus whereby cheaper gas (such as natural gas, illuminating gas or saturated hydrogen, that is, hydrogen saturated with the vapor of a liquid hydrocarbon) may be employed. A still further object of the invention is to provide an extremely efficient apparatus for burning gases and especially for cutting and to accomplish these objects in connection with a torch or blow pipe of the kind first referred to. Further and more limited objects will appear hereinafter and will be accomplished and realized in and through the combinations of elements embodied in the claims hereto annexed and exemplified in the drawings forming part hereof, wherein Figure 1 represents a side elevation of a blow pipe or torch constructed in accordance with my invention and capable of carrying out the same; Fig. 2 a top plan view of the same; Fig. 3 an enlarged central sectional view, with certain parts in elevation, of the torch shown in Fig. 1; Figs. 4, 5 and 6 are sectional details corresponding respectively to the lines 4—4, 5—5 and 6—6 of Fig. 3; Fig. 7 is a detail in elevation of the central oxygen nozzle of the torch; Fig. 8 is a detail in section illustrating the positions of the parts at the delivery or discharge end of the blow pipe or torch during the preliminary or preheating operation; Fig. 9 a similar view showing the positions of the parts during the combined cutting and preheating operation; while Fig. 10 is an elevation showing a modification of the torch or blow pipe illustrated in the preceding figures.

Describing by reference characters the various parts illustrated in the drawings and with particular reference to Figs. 1 to 9 inclusive, 1 denotes a valve body (preferably a casting) through which the combustible gas and the oxygen are conducted to the burner proper of the torch. The rear end of this valve body is suitably shaped to receive a casing 2, preferably cylindrical and adapted to form a handle whereby the torch may be manipulated and operated. 3 denotes a tube leading from any convenient source of combustible gas (such as natural gas, artificial illuminating gas, or saturated hydrogen) to a connection 4 from which a tube 5 extends to the rear end of the valve body 1. 6 denotes a flexible tube extending from a source of oxygen under pressure to a connection 7 at the rear end of the casing 2 and from which connection a tube 8 conducts the oxygen to the rear end of the valve body 1. 9 denotes a transversely extending bore near the rear end of the valve body 1. At its inner end, this bore is provided with a frustoconical valve seat 10 from which an angular passageway 11 extends to and communicates with the pipe 5. 12 denotes a valve which coöperates with the valve seat 10 and which is carried within the inner end of a valve body 13, threaded into the bore 9, having at its outer end an operating hand wheel 14, and provided with a packing gland 15 and packing 16. From the inner end of the bore 9, adjacent the valve seat 10, a passageway 17 extends to the front end of the valve body 1, and from this front end of the valve body extends a tube 18. It will be evident that the flow of combustible gas through the valve body 1 will be controlled by suitably manipulating the valve handle 14.

At one side of the center—in order to clear the valve mechanism for the combustible gas—the valve body 1 is provided with an enlarged vertical bore 20 having an inverted frustoconical valve seat 21 from which there extends a smaller bore or passageway 22 communicating with an enlarged central chamber 23. From this chamber there extends a reduced bore—preferably a continuation of the bore 22—which is adapted to receive and guide a stem 24 having at its upper end a head 25 and having its lower end reduced, as shown at 26, whereby ample clearance for the passage of gas is provided between the same and the surrounding wall of the bore or passageway 22.

Within the bore 20 there is located a valve which comprises a cylindrical body 27 having a recess in its upper end provided with a valve body 28 adapted to engage the conical seat 21. The lower end of the body 27 is recessed and receives a helical spring 29, the opposite end whereof bears against a cap 30 which is threaded onto a nipple 31 wherein part of the passageway 20 is located. It will be observed that, when the valve is on its seat, it partly covers the inner end of the passageway 19 and that, as it is opened, it progressively uncovers said passageway. The bore for the stem 24 merges into a cup in the upper part of the valve body 1. At its bottom, this cup is provided with a flat annular seat 32 for a flexible leak-proof diaphragm 33, said diaphragm being clamped in place by means of an externally threaded clamp 34 which is screwed into the upper part of the cup and which engages at its lower end a washer 35 bearing on top of the peripheral portion of the diaphragm. The flat upper portion of the clamp is provided with a central tubular extension 34$^a$ and outside of this extension it is perforated, as shown at 34$^b$ whereby the diaphragm may move without obstruction by any confined air. Within the extension or nipple 34$^a$ of the clamp there is threaded a tubular body 36 having a knurled head 37. Mounted within such body 36 is a valve-operating stem 38 having a head 39 at its lower end bearing against the diaphragm opposite the head 25 on the stem 24. From the chamber 23 a bore 40 extends to the oxygen pipe 41.

The tubes 18 and 41 extend from the valve body 1 to the head or body of the burner portion of the torch. The burner portion of the torch consists generally of three parts, namely: a head or body 42 with which the tubes 18 and 41 are connected, a tip 43 slidably connected to the lower end of a tubular shell 42$^a$ carried by said head or body, and an oxygen nozzle 44 which is arranged centrally within the head and which projects beyond the lower end thereof and into the tip. The oxygen nozzle has a reduced threaded extension 45 at its upper end whereby it is adapted to be threaded into the lower end of the central passageway 46 in the head and the discharge portion of its bore 44$^a$ is tapered, as shown at 44$^b$. The lower end of the nozzle is of frustoconical shape, as indicated at 47, whereby, when the parts are in the positions shown in Figs. 3 and 8, a tapered annular passageway is provided between the interiorly tapered end of the tip and the exteriorly tapered end of the nozzle.

The nozzle 44 is provided with a squared portion 48 part of which is located within the lower end of the shell 42$^a$ and a part of which extends beyond said shell. This not only affords means for applying a wrench to the nozzle whereby it may be conveniently applied to and removed from the head, but, as will appear from Fig. 6, affords means for centering the lower portion of the nozzle within the shell while providing passageways 48$^a$ between the nozzle and the shell. The lower end of the tip 43 is also frustoconical in shape, as indicated at 43$^a$ and, when the parts are in the condition which they assume during the preheating operation, the end of the tip 43$^a$ projects a considerable distance beyond the end of the nozzle 47.

Registering with the discharge end of the tube 18 is a passageway 49 which extends downwardly in the head and then inwardly into the upper end of the annular chamber 50 provided between the nozzle 44 and the tubular shell 42$^a$ carried by the burner head or body. The forward end of the oxygen tube 41 communicates with a passageway 51 (see Fig. 5) which discharges into the upper end of the chamber or bore 46, whence the oxygen passes through the central bore 44$^a$ within the oxygen nozzle.

52 denotes a pair of lugs which are carried by the front end of the valve body and which extend above the head 37. A bent lever having a vertical arm 53 and a horizontal arm 54 provided with a handle 55 is pivoted between the lugs 52, as indicated at 52ª. The arm 54 of this lever extends across and above the top of the stem 38, and a helical spring 56 is interposed between such portion of the lever and the tubular body 36, said tubular body having a recess in the upper end thereof for the accommodation of the lower end of the spring. 57 denotes a pair of lugs projecting upwardly from the burner head and between which there is pivoted an angle lever having a horizontally extending portion 58 and a vertically extending portion 59—the terms "vertical" and "horizontal" being used with reference to the position in which the torch is shown in the drawing, namely: with its discharge end directed downwardly. The lower end of the lever arm 59 is connected by means of a link 60 with the lower end of the lever arm 53. The forward end of the lever arm 58 is provided with a slot 61 through which there extends the central portion 62 of an inverted U shaped yoke, the vertically extending branches 63 whereof are connected to opposite sides of the upper end of the tip 43, as by means of perforated lugs 64 having set screws 65 threaded thereinto and adapted to engage the lower ends of the branches 63.

With the parts constructed and arranged as described, the operation will be as follows:—Combustible gas and oxygen having been turned into their respective tubes 3 and 6, the valve 12 may be opened to supply combustible gas to the chamber 50. Oxygen in sufficient quantity to produce a detonating mixture for a large preheating flame will then be turned on by merely screwing inwardly the tubular body 36 by manipulating the head 37. This will depress the oxygen valve against the action of the spring 29 and thereby open the valve a sufficient distance to secure a proper preheating flame, such as indicated in Fig. 8. The oxygen—indicated at 66—issuing from the nozzle 44 will be so controlled as to secure a detonating mixture proper for preheating and at the same time will be so reduced in pressure as not to be capable of expanding into engagement with the inner wall 43ᵇ of the discharge end of the tip 43, which would result in cutting off or cutting down the supply of combustible gas, thus seriously affecting the character of the preheating flame and, in fact, even extinguishing the same. When the metal has been preheated to the desired extent the operator, grasping the handle casing 2 and the lever handle 55, depresses or moves the lever handle toward the casing 2. It will be noted that the first result of such movement will be a compression of the spring 56 and a rocking of the two angle levers, resulting in lifting the tip 43 to the position shown in Fig. 9. This operation will cause the horizontal arm 54 to be moved into approximate engagement with the stem 38, and further movement of the lever will result in opening the oxygen valve to the extent desired to produce both a cutting and a preheating flame, as shown in Fig. 9. It will be evident that, assuming the ordinary working condition wherein the combustible gas is under a materially less pressure than the oxygen, moving the tip 43 upwardly and bringing the discharge end of such tip and the discharge end of the nozzle 47 into substantial alinement will correspondingly decrease the aspirating effect of the oxygen upon the combustible gas, thereby automatically diminishing the proportion of such combustible gas while increasing the proportion of the oxygen. Furthermore, were it not for moving the tip 43 upwardly, increasing the oxygen supply would result in the oxygen spreading into engagement with the mouth 43ᵇ, thereby practically cutting off the supply of combustible gas and extinguishing the flame. With my construction, however, I automatically control the supply of the combustible gas through the supply of the oxygen, decreasing the former as the latter is increased for the combined cutting and preheating operation. It will thus be seen that I automatically secure a combined preheating and cutting flame by this operation and secure this result without any danger of "backfiring" or extinguishing of the flame, inasmuch as the tip 43 is moved up upon the discharge end of the oxygen nozzle simultaneous with increasing the supply of oxygen to said nozzle. Also it will be seen that, by operating the oxygen valve to secure the cutting action, I also automatically change from a flame produced from a detonating mixture of gases to one produced by the combustion of gases mixed outside the torch and substantially at the point of ignition.

In Fig. 10 there is shown a side elevation of a torch which is identical with the one hereinbefore described except that the lever 68 which turns on the additional supply of oxygen for cutting is disconnected from the tip 43 and said tip is adjusted by means of a separate lever 69 pivoted to the lugs 70 carried by the torch head 42 and having its forward end connected to the tip by means of a slot 71 in the lever and a yoke similar to the yoke 62, 63, the depending legs 72 of the present yoke being connected to the nozzle lugs 73 by means of set screws 74. With this construction, the operator will depress the rear end of the lever 69 so as to bring the end of the tip 43 in substantially the plane of the discharge end of the oxygen nozzle, after which the lever 68 will be depressed to turn on the additional supply of oxygen necessary for maintaining a cutting and preheating flame wherein the gases are mixed substantially at the point of ignition.

With the apparatus constructed and arranged as described, I am enabled to employ comparatively cheap gases for cutting purposes, (such as ordinary natural and artificial city gas and saturated hydrogen) and to cut thereby as efficiently as has heretofore been possible with the more expensive gases, such as acetylene. Furthermore the flame which is produced when the parts are in the positions shown in Fig. 9 is one which will both preheat and cut with a minimum of "slagging" or fusing of the metal at the sides of the cut.

Having thus described my invention, what I claim is:

1. In a torch of the character described, a head having combustion and cutting gas pipes leading thereinto, a nozzle arranged within said head and having communication with said cutting gas pipe and a tip connected to said head and surrounding the discharge end of said nozzle, said tip being adjustable during operation.

2. In a torch of the character described, a head having combustion and cutting gas pipes leading thereinto, a nozzle within said head and having communication with said cutting gas pipe, a tip upon said head and surrounding said nozzle and means for adjusting positions of said tip during operation.

3. In a torch of the character described, a head having combustion and cutting gas pipes leading thereinto, a nozzle within said head and having communication with said cutting gas pipe, a tip upon said head and surrounding said nozzle and means for adjusting said tip upon said head during operation whereby the relative positions of the discharge ends of said nozzle and tip are varied.

4. In a torch of the character described, a head having cutting and gas pipes leading thereinto, a nozzle within said head and having communication with said cutting gas pipe, a tip upon said head and surrounding said nozzle, a casing with which said pipes are connected, a valve for controlling the passage of combustion gas through said casing to the combustion gas pipe, a valve for controlling the passage of cutting gas through said casing to said cutting gas pipe, means for imparting an additional volume to said valve and means for adjusting the tip as the position of said cutting gas valve is changed.

5. In a torch of the character described, a head having combustion and cutting gas pipes leading thereinto, a nozzle within said head and communicating with said cutting gas pipe, a tip upon said head, a casing, a valve for controlling the passage of combustion gas and a valve for controlling the cutting gas together with means for simultaneously operating said cutting gas valve and tip whereby as the supply of cutting gas is increased or decreased the tip will be raised or lowered thereby shifting the relative positions of the discharge ends of the nozzle and tip.

6. In a torch of the character described, the combination, with a head, of a nozzle arranged within said head and a tip arranged upon said head, means for supplying a combustible fluid to the head, means for supplying a cutting gas to the nozzle, and means for changing the position of the discharge end of the tip whereby the flame can be changed from a preheating to a cutting flame and vice versa and during ignition.

7. In a torch of the character described, the combination, with a head, of a nozzle within said head and spaced therefrom, a tip upon said head and surrounding the discharge end of nozzle, the discharge end of said tip being adjustable, means for supplying a gas under relatively low pressure to the head, means for supplying a gas under relatively high pressure to the nozzle, and means for shifting the position of said tip.

8. In a torch of the character described, the combination of a head having a nozzle and a tip connected to said head together with means for supplying a combustible fluid to the head and a cutting gas to the nozzle, said tip being adjustable and capable by such adjustment of changing a preheating flame to a cutting or an oxidizing flame and vice versa and means whereby such adjustment may be effected during ignition.

9. In a torch of the character described, the combination of a head having connections for supplying a combustible fluid and a combustion supporting fluid therethrough, a nozzle arranged within said head, a tip connected to said head, said tip being adjustable and capable by such adjustment of varying the character of the flame produced, and means whereby such adjustment may be effected during ignition.

10. In a torch of the character described, the combination of a head having connections for supplying a combustible fluid and a combustion supporting fluid therethrough, a nozzle within said head and a longitudinally adjustable tip arranged upon said head and means whereby said tip may be so adjusted during ignition.

11. In a torch of the character described, the combination of a head or body, said head or body comprising a centrally arranged nozzle and a tip longitudinally adjustable with respect to said body and to said nozzle and adapted in one position to form with the nozzle a mixing chamber, means for supplying a fluid to the space between the tip and the nozzle, means for supplying a cutting gas to the nozzle, means for increasing the supply of cutting gas, and connections between the last mentioned means and the tip whereby the position of the tip with reference to the nozzle may be automatically varied through the operation of such gas-increasing means.

12. In a torch of the character described, the combination of a body, connections for supplying combustible gas and a cutting gas to said body, a longitudinally adjustable tip connected with said body, means for regulating the proportions of the gases to produce a preheating flame, and means operatively connected with the tip to adjust the same and to simultaneously increase the supply of the cutting gas.

13. In a torch of the character described, the combination of a burner body having a tip member and a centrally arranged nozzle member within said tip, means for supplying a combustible fluid to the space between said nozzle and tip, means for supplying a cutting fluid to the nozzle, means for increasing the supply of cutting fluid through the nozzle, and connections whereby said tip member will be moved longitudinally through the operation of the means for increasing the supply of the cutting fluid.

14. In a torch of the character described, the combination of a head or body, said head or body comprising a centrally arranged nozzle and a tip, said tip being adjustable upon said body, means for supplying a fluid to the space between said members, means for supplying a cutting gas to the nozzle, means for increasing the supply of cutting gas, and connections between the last mentioned means and the movable member whereby the positions of said members may be automatically varied through the operation of the gas-increasing means.

15. In a burner or torch of the character described, the combination of a burner body having a tip, a nozzle within and spaced from the tip, connections for supplying a gas under relatively low pressure to the space between said nozzle and tip, connections for supplying a gas under relatively high pressure to the nozzle, means for increasing the supply of gas through the nozzle, and means connected with the last mentioned means for automatically diminishing the aspirating effect of the gas supplied through the nozzle upon the gas supplied to the space between said members during ignition.

16. In a torch of the character described, the combination of a burner body having a tip and a nozzle within and spaced from the tip, said tip being longitudinally adjustable, connections for supplying a fluid under relatively light pressure to the space between said members, connections for supplying a fluid under relatively high pressure to the nozzle, and means connecting the movable member with the means for supplying fluid to the nozzle whereby the positions of said nozzle and tip and the aspirating effect of the higher pressure fluid upon the lower pressure fluid will be automatically varied upon an increase in supply of such higher pressure fluid during ignition.

17. In a torch of the character described, the combination of a burner body having a tip and a nozzle within and spaced from the tip, said tip being longitudinally adjustable, connections for supplying a fluid under relatively light pressure to one of said members, connections for supplying a fluid under relatively high pressure to the other member, and means connecting the movable member with the means for supplying fluid to one of said members whereby the positions of said members and the supply of such fluid will be varied during ignition.

18. In a torch of the character described, the combination of a body having a tip and a nozzle within and spaced from the tip, said tip being longitudinally adjustable, means for supplying a fluid to the space between said members, means for supplying another fluid to the inner member, means connected with the movable member for operating the same, and connections operative, when the last mentioned member has been moved a predetermined distance, to increase the supply of fluid to the inner or tip member during ignition.

19. In a torch of the character described, the combination of a burner body having a tip, a nozzle within and spaced from the tip, said tip being longitudinally adjustable whereby in one of the adjusted positions a mixing chamber is provided in the tip extending beyond the nozzle and in another adjusted position the discharge ends of said members are in substantially the same plane, means for operating the movable member, connections for supplying fluids to said members, and means for increasing the supply of fluid to the tip member and arranged to be operated by such adjusting means.

20. In a torch of the character described, the combination of a burner body, connections for supplying a combustible fluid to said body, connections for supplying oxygen to said body, means whereby a preheating mixture may be delivered from said torch, and adjustable means whereby the supply of oxygen to said body may be increased and the supply of combustible fluid from said body may be automatically reduced upon such increase of the oxygen supply during ignition.

21. In a torch of the character described, the combination of a body having a tip and a nozzle within and spaced from the tip, said tip being longitudinally movable, means for supplying a fluid to the space between said members, means for supplying another fluid to the inner member, means connected with the movable member for operating the same, and connections whereby, when the last mentioned member has been moved a predetermined distance, the supply of fluid to the other member will be varied.

22. In a torch of the character described, the combination of a burner body having a tip, a nozzle within and spaced from the tip, said tip being longitudinally adjustable whereby in one of the adjusted positions a mixing chamber is provided in the tip extending beyond the nozzle and in another adjusted position the discharge ends of said members are in substantially the same plane, means for operating the movable member, connections for supplying fluids to said members, and means for increasing the supply of gas to the tip member arranged to be operated by such adjusting means when the ends of the members have been brought into substantially the same plane.

23. In a torch of the character described, the combination of a burner body, means for supplying combustible gas to said body, means for supplying oxygen to said body to form a mixture suitable for preheating, and adjustable means whereby, on increasing the supply of oxygen, the supply of combustible gas will be reduced and a combined cutting and preheating mixture will be produced during ignition.

24. In a torch of the character described, the combination of a burner body having a longitudinally adjustable tip and a nozzle within and spaced from said tip, means for supplying a combustible gas to the space between the tip and the nozzle, means for supplying oxygen to the interior of the tip, a valve controlling the oxygen supply, means for operating said valve whereby to supply oxygen in sufficient quantity to produce a preheating flame with the combustible gas, a lever, connections between said lever and said tip for moving the same longitudinally with respect to the nozzle, connections whereby, when the lever has been moved a predetermined distance it will operatively engage the oxygen valve to further open the same, and means for closing said valve.

25. In a torch of the character described, the combination of a burner body, means for supplying combustible gas to said body, means for supplying oxygen to said body to form within the burner body a mixture suitable for preheating, and adjustable means operable during ignition whereby, on increasing the supply of oxygen, the supply of combustible gas will be reduced and a combined cutting and preheating mixture will be produced outside of the burner body.

26. In a torch of the character described, the combination of a burner body having a tip and a nozzle within and spaced from said tip, said tip being longitudinally adjustable, means for supplying a combustible gas to the space between said members, means for supplying oxygen to the interior of the nozzle, a valve controlling the oxygen supply, means for operating said valve whereby to supply oxygen in sufficient quantity to produce a preheating flame with the combustible gas, a lever, connections between said lever and the movable member for moving the latter longitudinally with respect to the other member, and connections whereby, when the lever has been moved a predetermined distance it will operatively engage the oxygen valve to further open the same.

27. In a torch of the character described, the combination of a burner body having a nozzle and a tip surrounding the nozzle, said tip being longitudinally movable, an oxygen supply conduit leading to the interior of the nozzle, a valve controlling the flow of oxygen through said conduit and having means tending to seat the same, means for partially opening said valve thereby to supply oxygen to the tip member in suitable proportions to form with the combustible gas a preheating mixture, a stem operatively connected with the oxygen valve, a lever extending across said stem and operatively connected with the movable member, and a lost-motion connection between the lever and the valve stem whereby, upon moving the movable member a predetermined distance, the lever will engage the valve stem and further open the oxygen valve.

28. In a torch of the character described, the combination of a burner body having a centrally arranged nozzle and a surrounding tip, means for supplying combustible gas to the space between the nozzle and tip, means for supplying oxygen to the interior of the nozzle, the last mentioned means including a valve body having a passageway therethrough communicating with the oxygen supply leading to the nozzle, a valve-operating stem mounted within and spaced from a part of the passageway and adapted to be projected through the seat, there being a guideway extending from the seat, a reciprocating valve in said guideway, means tending to hold said valve against said seat, a guideway for the valve-operating stem extending from the passageway, a head on said stem, a diaphragm secured to the valve body and extending across said head, a clamping device for said diaphragm having a central boss, a valve operating plug adjustable with respect to the boss and adapted by its adjustment to move the valve-operating stem and open the valve, a stem reciprocably mounted within the plug and extending thereabove, a spring surrounding the outer portion of said stem, and an operating lever extending across the last mentioned stem and operatively engaging the spring.

In testimony whereof, I hereunto affix my signature in the presence of two witnesses.

JOHN HARRIS.

Witnesses:
A. H. BRAINERD,
R. L. BRUCK.